US008571757B2

(12) United States Patent
Ogawa et al.

(10) Patent No.: US 8,571,757 B2
(45) Date of Patent: Oct. 29, 2013

(54) STEERING APPARATUS FOR A VEHICLE

(75) Inventors: Kenji Ogawa, Chiyoda-ku (JP);
Masafumi Okazaki, Chiyoda-ku (JP);
Masayoshi Yamamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 848 days.

(21) Appl. No.: 12/594,703

(22) PCT Filed: May 30, 2007

(86) PCT No.: PCT/JP2007/060998
§ 371 (c)(1),
(2), (4) Date: Oct. 5, 2009

(87) PCT Pub. No.: WO2008/146372
PCT Pub. Date: Dec. 4, 2008

(65) Prior Publication Data
US 2010/0125385 A1    May 20, 2010

(51) Int. Cl.
*G06F 17/00* (2006.01)
*G06F 19/00* (2011.01)
*B62D 5/04* (2006.01)

(52) U.S. Cl.
USPC .............. 701/41; 701/29.2; 701/43; 180/443

(58) Field of Classification Search
USPC ........... 701/29.1, 29.2, 31.7, 31.8, 36, 41, 42,
701/43; 180/400, 404, 405, 407, 443, 444
See application file for complete search history.

(56) References Cited

U.S. PATENT DOCUMENTS

| 6,705,420 | B2 * | 3/2004 | Ono et al. ................. 180/407 |
| 6,718,242 | B1 | 4/2004 | Mori et al. |
| 2002/0092696 | A1 * | 7/2002 | Bohner et al. ............ 180/405 |
| 2003/0079932 | A1 * | 5/2003 | Ono et al. ................. 180/407 |
| 2003/0098197 | A1 * | 5/2003 | Laurent et al. ............ 180/401 |

FOREIGN PATENT DOCUMENTS

| EP | 1 495 944 A1 | 1/2005 |
| JP | 01-178079 A | 7/1989 |
| JP | 2001-278087 A | 10/2001 |
| JP | 2002-145102 A | 5/2002 |
| JP | 2003-205848 A | 7/2003 |

(Continued)

*Primary Examiner* — Jack Keith
*Assistant Examiner* — Edward Pipala
(74) *Attorney, Agent, or Firm* — Sughrue Mion, PLLC

(57) ABSTRACT

In a steering apparatus for a vehicle which has a steering mechanism for steering steerable road wheels by means of a steering wheel operated by a driver and an electrically controllable auxiliary steering angle superposition mechanism, and in which a target auxiliary steering angle is set in accordance with a steering wheel angle, and an electric motor of the auxiliary steering angle superposition mechanism is driven and controlled according to the target auxiliary steering angle, the rotation of the electric motor 212 is inhibited without regard to the state of the driving control. A short-circuit relay 13 is provided for short-circuiting opposite terminals of the electric motor 212, and the short-circuit relay 13 is operated so as to short-circuit the opposite terminals of the electric motor 212 through a short-circuit relay driving unit 14 in accordance with the kind of a failure detected by a failure detection unit 18, whereby the rotation of the electric motor 212 is inhibited. In addition, when a power supply to the steering apparatus for a vehicle is interrupted, the short-circuit relay 13 operates, without power supply, to short-circuit the opposite terminals of the electric motor 212.

8 Claims, 5 Drawing Sheets

(56) References Cited

FOREIGN PATENT DOCUMENTS

| JP | 2003-219675 A | 7/2003 |
| JP | 2003-300473 A | 10/2003 |
| JP | 2004-330840 A | 11/2004 |
| JP | 2005-350036 A | 12/2005 |
| JP | 2006-103470 A | 4/2006 |
| JP | 2007-015631 A | 1/2007 |

* cited by examiner

STEERING APPARATUS FOR A VEHICLE

TECHNICAL FIELD

The present invention relates to a steering apparatus for a vehicle which mechanically superposes an auxiliary steering angle on a driver's steering-wheel steering angle to steer road wheels by means of an auxiliary steering angle superposition mechanism using an electrically controllable electric motor. In particular, it relates to a technique that inhibits the rotation of an electric motor in an apparatus that performs intervention steering so as to correct the operation of the steering wheel by a driver, or in an apparatus that changes a transmission characteristic between the steering angle of the steering wheel operated by the driver and the steered angle of the steerable road wheels.

BACKGROUND ART

Conventionally, there has been well known a steering apparatus for a vehicle which has an auxiliary steering angle superposition mechanism installed at a location between a steering wheel and steerable road wheels for changing a transmission characteristic between the steered angle of the steerable road wheels and the steering-wheel steering angle of a driver in accordance with the traveling condition of the vehicle (see, for example, a first patent document).

In this kind of steering apparatus, when the electric motor becomes a freely rotatable state, even if the driver steers the steering wheel, the steerable road wheels become unable to be steered while permitting only the electric motor to rotate. Accordingly, in order to deal with this problem, in the above-mentioned conventional apparatus, the rotation of the electric motor is inhibited by driving on one-side transistors of upstream side and downstream side transistors of a transistor bridge circuit and driving off the other-side transistors thereof for the purpose of inhibiting the rotation of the electric motor.
[First Patent Document]
Japanese patent application laid-open No. 2005-350036

DISCLOSURE OF THE INVENTION

Problems to be Solved by the Invention

In the conventional steering apparatus for a vehicle as referred to above, in case where a battery terminal comes off, or when the power supplied to a control device is interrupted due to the melting of a fuse, etc., or in case where a microcontroller governing control fails or a peripheral circuit, in particular a transistor bridge circuit, fails, it is impossible to drive on the one-side transistors and drive off the other-side transistors of the upstream side and downstream side transistors of the transistor bridge circuit that drives the electric motor, so there has been posed a problem that it become impossible to inhibit the rotation of the electric motor.

The present invention is intended to obviate the problem as referred to above, and hence to obtain a steering apparatus for a vehicle which is capable of quickly inhibiting the rotation of an electric motor without regard to the failure state of an electric motor driving unit or the like, whereby steerable road wheels can be steered in accordance with driver's steering operation of a steering wheel.

Means for Solving the Problems

A steering apparatus for a vehicle according to the present invention having a steering mechanism for steering steerable road wheels by means of a steering wheel that is operated by a driver and an auxiliary steering angle superposition mechanism by which an auxiliary steering angle can be superposed, includes: a transmission characteristic setting unit that sets a transmission characteristic between a steering angle of the steering wheel and a steering angle (steered angle) of steerable road wheels in accordance with a traveling condition of the vehicle; a steering wheel angle detection unit that detects a steering angle of the steering wheel operated by the driver; an auxiliary steering angle detection unit that detects an auxiliary steering angle to be steered by the auxiliary steering angle superposition mechanism or a steering angle detection unit that detects the steered angle of the steerable road wheels; a target driving amount calculation unit that generates a target auxiliary steering angle or a target steering angle added by the auxiliary steering angle superposition mechanism based on a steering-wheel steering angle detected value from the steering wheel angle detection unit and the transmission characteristic, and calculates a target amount of driving of the electric motor so as to make the target auxiliary steering angle and an auxiliary steering angle detected value from the auxiliary steering angle detection unit coincide with each other or so as to make the target steering angle and a steering angle detected value from the steering angle detection unit coincide with each other; an electric motor driving unit that drives the electric motor in accordance with the target amount of driving; and a relay unit that inhibits the rotation of the electric motor by short-circuiting opposite terminals of the electric motor under a predetermined condition.

Effects of the Invention

According to the present invention, the rotation of the electric motor can be inhibited in a quick manner without regard to the failure state of the electric motor driving unit or the like, whereby the steerable road wheels can be steered in accordance with driver's steering operation of the steering wheel.

BEST MODE FOR CARRYING OUT THE INVENTION

Embodiment 1

Figure 1:
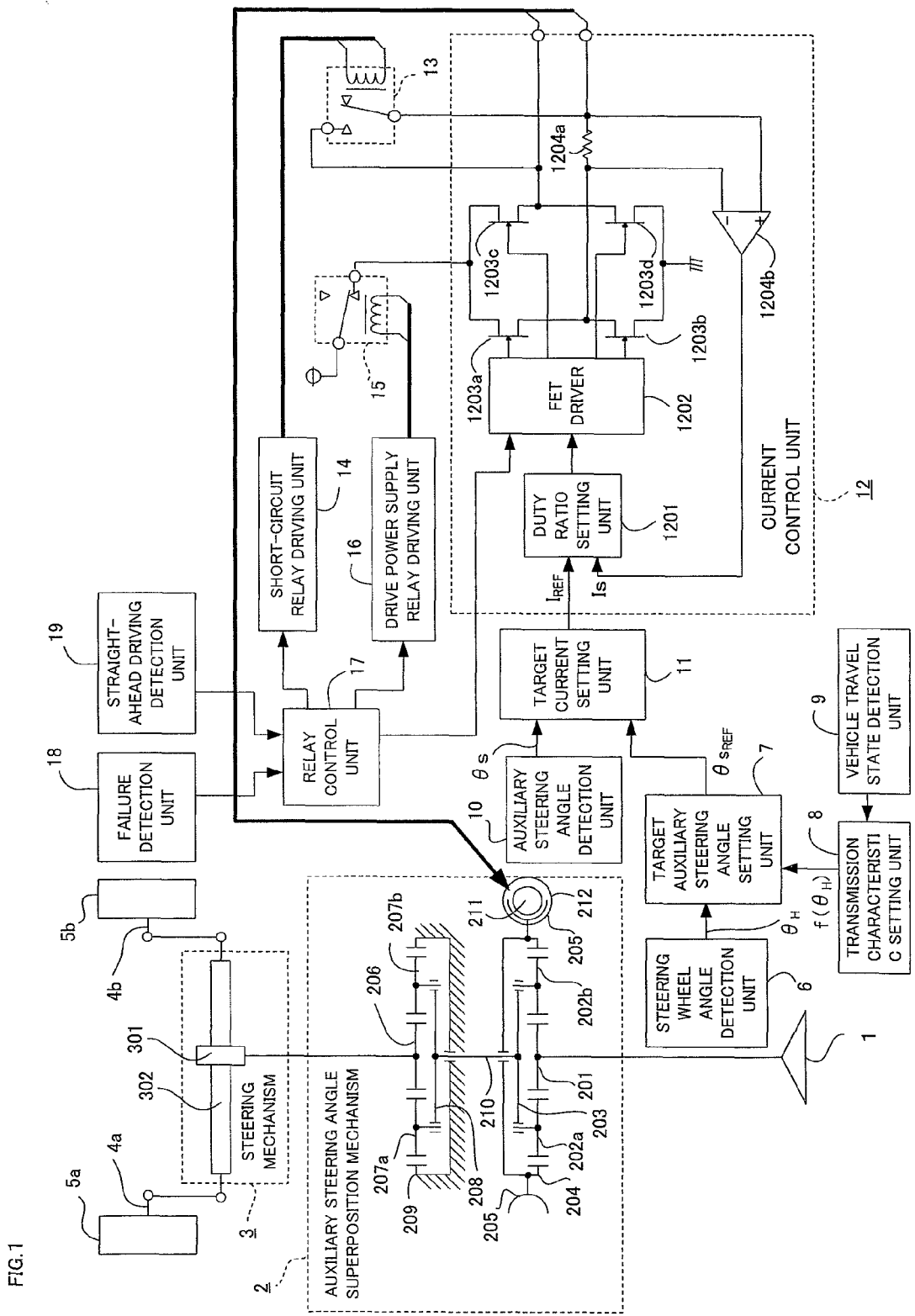
FIG. 1 is a block diagram showing the general outline of a steering apparatus for a vehicle according to a first embodiment of the present invention. (Embodiment 1)

FIG. 1 is a block diagram showing the general outline of a steering apparatus for a vehicle according to a first embodiment of the present invention.

In FIG. 1, the steering apparatus for a vehicle is provided with a steering wheel 1 to which the driver of the vehicle applies a steering effort, an auxiliary steering angle superposition mechanism 2 that is connected with the steering wheel 1 and is subjected to free electrical control, a rack-and-pinion type steering mechanism 3 that is connected with the auxiliary steering angle superposition mechanism 2, knuckle arms 4a, 4b that are connected with the steering mechanism 3, steerable road wheels 5a, 5b that are connected with the knuckle arms 4a, 4b, respectively, a steering wheel angle detection unit 6 that detects an amount of steering (steering wheel angle $\theta_H$) of the steering wheel 1, a target auxiliary steering angle setting unit 7 that sets a target auxiliary steering angle based on the steering wheel angle $\theta_H$, a transmission characteristic setting unit 8 that is connected to the target auxiliary steering angle setting unit 7, a vehicle travel state detection unit 9 that is connected to the transmission characteristic setting unit 8, an auxiliary steering angle detection unit 10 that detects an auxiliary steering angle (rotational angle $\theta_M$) due to the auxiliary steering angle superposition mechanism 2, a target current setting unit 11 that sets a target current based on the steering wheel angle and the auxiliary steering angle, a current control unit 12 that controls the drive current of the auxiliary steering angle superposition mechanism 2 based on the target current, a short-circuit relay 13 and a drive power supply relay 15 that are connected to the current control unit 12, a short-circuit relay driving unit 14 and a drive power supply relay driving unit 16 that drive the short-circuit relay 13 and the drive power supply relay 15, respectively, a relay control unit 17 that controls the short-circuit relay driving unit 14 and the drive power supply relay driving unit 16, and a failure detection unit 18 and a straight-ahead driving detection unit 19 that are connected to the relay control unit 17.

The auxiliary steering angle superposition mechanism 2 is composed, as an example, of a first planetary gear mechanism 201-205, a second planetary gear mechanism 206-209, and a shaft 210 that connects the two planetary gear mechanisms with each other, a worm gear 211 that is connected with the first planetary gear mechanism, and an electric motor (a motor) 212 that drives the worm gear 211 under the control of the current control unit 12.

The first planetary gear mechanism is composed of a sun gear 201 that is connected with the steering wheel 1, planetary gears 202a, 202b that are supported by a carrier 203, a ring gear 204, and a worm wheel 205 for rotating the ring gear 204.

The second planetary gear mechanism is composed of a sun gear 206, planetary gears 207a, 207b that are supported by a carrier 208, and a fixed ring gear 209. In addition, the carrier 203 of the first planetary gear mechanism and the carrier 208 of the second planetary gear mechanism are connected with each other through the shaft 210.

The steering mechanism 3 is composed of a pinion gear 301, and a rack gear 302 that is in mesh with the pinion gear 301. The rotation of the pinion gear 301 is converted into a linear motion of the rack gear 302, and the linear motion of the rack gear 302 is converted into a steered angle of the steerable road wheels 5a, 5b through the knuckle arms 4a, 4b, respectively.

The steering wheel angle detection unit 6 detects the steering angle of the steering wheel 1 that is steered by the driver, and inputs the steering wheel angle $\theta_H$ to the target auxiliary steering angle setting unit 7. The detected information from the vehicle travel state detection unit 9 is input to the transmission characteristic setting unit 8.

The auxiliary steering angle detection unit 10 detects a rotational angle of the electric motor 212 substantially corresponding to the auxiliary steering angle $\theta s$, and inputs it to the target current setting unit 11. The target current setting unit 11 calculates a target current $I_{REF}$ for driving the electric motor 212 based on a target auxiliary steering angle $\theta s_{REF}$ from the target auxiliary steering angle setting unit 7 and the auxiliary steering angle $\theta s$ from the auxiliary steering angle detection unit 10, and inputs it to the current control unit 12.

In order to control the drive current of the electric motor 212 in the auxiliary steering angle superposition mechanism 2, the current control unit 12 is constructed of a duty ratio setting unit 1201, an FET driver 1202, an H bridge circuit (FETs 1203a-1203d) driven by the FET driver 1202, and a current detection resistor 1204a, and a differential amplifier 1204b that differentially amplifies a voltage across opposite ends of the current detection resistor 1204a.

The target current $I_{REF}$ from the target current setting unit 11 and a detected current Is from the differential amplifier 1204b are input to the duty ratio setting unit 1201. A duty ratio from the duty ratio setting unit 1201 and a control signal from the relay control unit 17 are input to the FET driver 1202. An output terminal of the H bridge circuit comprising the four FETs 1203a-1203d is connected to the electric motor 212.

The short-circuit relay 13 is driven by the short-circuit relay driving unit 14 to short-circuit the opposite terminals of the electric motor 212. The drive power supply relay 15 is driven by the drive power supply relay driving unit 16 to supply and interrupt the drive power to the current control unit 12.

The failure detection unit 18 inputs a failure detection signal to the relay control unit 17 at the time of detecting the failure of various elements such as the auxiliary steering angle detection unit 10, the differential amplifier 1204b, etc., and upon detection of straight-ahead driving, the straight-ahead driving detection unit 19 inputs a detection signal to indicate a straight-ahead driving state to the relay control unit 17. As a result, the relay control unit 17 decides the operations of the short-circuit relay 13 and the drive power supply relay 15 in accordance with the kind of failure upon occurrence thereof as well as in accordance with the straight-ahead driving state.

The short-circuit relay driving unit 14 and the drive power supply relay driving unit 16 control the operations of the short-circuit relay 13 and the drive power supply relay 15 in response to the control signal from the relay control unit 17.

Next, reference will be made to the operation of the steering apparatus for a vehicle according to the first embodiment of the present invention, as shown in FIG. 1.

First of all, reference will be made to the state in which the worm gear 211 in the auxiliary steering angle superposition mechanism 2 is prevented from rotation.

When the worm gear 211 is prevented from rotation, the ring gear 204 of the first planetary gear mechanism is fixed. Under such a condition, when the driver operates the steering wheel 1, the rotating torque of the steering wheel 1 is transmitted to the sun gear 201 of the first planetary gear mechanism.

Subsequently, the rotation of the sun gear 201 is transmitted to the planetary gears 201a, 201b, but the ring gear 204 is fixed as previously stated, so the carrier 203 supporting the planetary gears 202*a*, 202*b* is caused to revolve around the sun gear, and the shaft 210 for the transmission of rotation to the second planetary gear mechanism is driven to rotate. That is, the first planetary gear mechanism acts as a planetary gear type speed reducer.

Then, the rotation of the shaft 210 is transmitted to the carrier 208 of the second planetary gear mechanism, whereby the planetary gears 207*a*, 207*b* are driven to revolve around the sun gear 206 in accordance with the rotation of the carrier 208. Here, in the second planetary gear mechanism, the ring gear 209 is fixed, so the revolutions of the planetary gears 207*a*, 207*b* cause the sun gear 206 to rotate, whereby the pinion gear 301 in the steering mechanism 3 is driven to rotate.

At this time, the second planetary gear mechanism operates as a speed increasing gear, as viewed from the shaft 210. Accordingly, the rotation of the steering wheel 1 is mechanically transmitted to the pinion gear 301 with a transmission ratio of 1:1.

That is, the transmission ratio from the steering wheel 1 to the pinion gear 301 is a value which is obtained by multiplication of the speed reduction ratio of the first planetary gear mechanism and the speed reduction ratio (speed increasing ratio) of the second planetary gear mechanism, and if the constructions of the two planetary gear mechanisms are the same with respect to each other, the transmission ratio as a whole becomes "1". That is, in the mechanism of this first embodiment, if the rotation of the worm gear 211 is stopped, the steering wheel angle $\theta_H$ and the pinion angle of the steering mechanism 3 becomes "1:1", so it is found that an ordinary steering system is substantially constructed.

Now, reference will be made to the case where the worm gear 211 is driven to rotate by the use of the electric motor 212 with the steering wheel 1 being fixed.

When the worm gear 211 is driven to rotate, the ring gear 204 is caused to rotate through the worm wheel 205.

The rotation of the ring gear 204 is transmitted to the planetary gears 202*a*, 202*b*, but the sun gear 201 is fixed by the steering wheel 1, so the rotational torque to the planetary gears 202*a*, 202*b* is transmitted to the shaft 210 through the carrier 203 as the revolutions of the planetary gears 202*a*, 202*b*. As the shaft 210 rotates, the steering mechanism 3 is driven to steer the steerable road wheels 5*a*, 5*b* through the second planetary gear mechanism, as stated above.

Next, reference will be made to the case where the worm gear 211 is driven to rotate by the use of the electric motor 212 while operating the steering wheel 1.

Herein, explanation will be made by using the steering wheel angle $\theta_H$ of the steering wheel 1, the rotation angle $\theta_M$ of the electric motor 212, the rotation angle $\theta p$ of the pinion gear 301, and a speed ratio Gs from the worm gear 211 to the pinion gear 301. Here, as stated above, the following equation (1) holds, and hence the auxiliary steering angle superposition mechanism 2 is constructed which is electrically controllable.

$$\theta_P = \theta_H + \theta_M/G_S \quad (1)$$

Here, by denoting "$\theta_M/G_S$" in equation (1) as the auxiliary steering angle $\theta s$, equation (1) can be transformed into the following equation (2).

$$\theta_P = \theta_H + \theta_S \quad (2)$$

In the following, reference will be made, by way of example, to a "variable gear ratio mechanism" that changes the ratio between the steering angle of the steering wheel 1 and the steered angle of the steerable road wheels 5*a*, 5*b* in accordance with the traveling condition of the vehicle.

Figure 2:
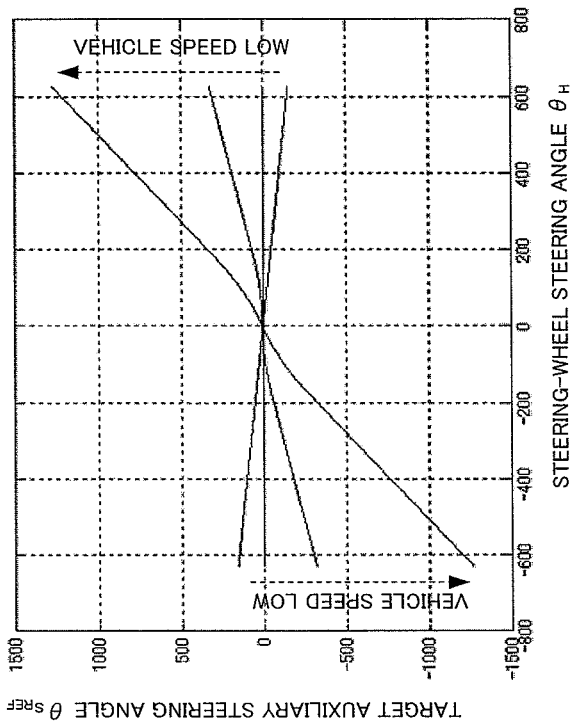
FIG. 2 is an explanatory view illustrating an example of a transmission characteristic used for deciding a steering wheel angle to a target steered angle in case where a variable gear ratio mechanism is constructed by using the steering apparatus for a vehicle according to the first embodiment of the present invention. (Embodiment 1)

FIG. 2 is an explanatory view illustrating a characteristic of a target steering angle with respect to the steering wheel angle, wherein one example of a transmission characteristic f ($\theta_H$) of the target steering angle (a target steered angle, a target pinion angle) $\theta p_{REF}$ with respect to the steering wheel angle $\theta_H$ is shown as a value corresponding to the vehicle speed.

Figure 3:
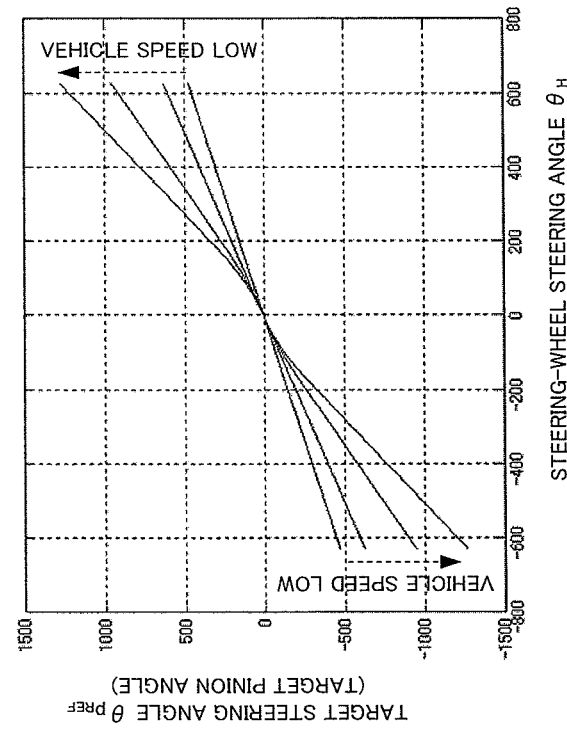
FIG. 3 is an explanatory view illustrating an example of a transmission characteristic used for deciding a steering wheel angle to a target steered angle in case where a variable gear ratio mechanism is constructed by using the steering apparatus for a vehicle according to the first embodiment of the present invention. (Embodiment 1)

FIG. 3 is an explanatory view illustrating a characteristic of the target auxiliary steering angle with respect to the steering wheel angle, wherein one example of the transmission characteristic f ($\theta_H$) of the target auxiliary steering angle $\theta s_{REF}$ to the steering wheel angle $\theta_H$ and one example of the characteristic of the mechanism are shown as values corresponding to the vehicle speed.

FIG. 2 and FIG. 3 show the results obtained from the above equation (2) according to the following equations (3) and (4).

$$\theta_{PREF} = \theta_H + \theta_{SREF} \quad (3)$$

$$\therefore \theta_{SREF} = \theta_{PREF} - \theta_H \quad (4)$$

The transmission characteristic setting unit 8 in FIG. 1 sets the transmission characteristic f ($\theta_H$) in accordance with the vehicle speed which is one of the detected pieces of information from the vehicle travel state detection unit 9, and the target auxiliary steering angle setting unit 7 sets the target auxiliary steering angle $\theta s_{REF}$ from the steering wheel angle $\theta_H$ from the steering wheel angle detection unit 6 and the transmission characteristic f ($\theta_H$) from the transmission characteristic setting unit 8.

On the other hand, the auxiliary steering angle detection unit 10 detects the auxiliary steering angle $\theta s$, and the target current setting unit 11 calculates the target current $I_{REF}$ based on the target auxiliary steering angle $\theta s_{REF}$ and the auxiliary steering angle (the detected value) $\theta s$.

Next, reference will be made to a calculation method for the target current $I_{REF}$ according to the target current setting unit 11 and a calculation method for the duty ratio according to the duty ratio setting unit 1201 in the current control unit 12 while referring to FIG. 4.

Figure 4:
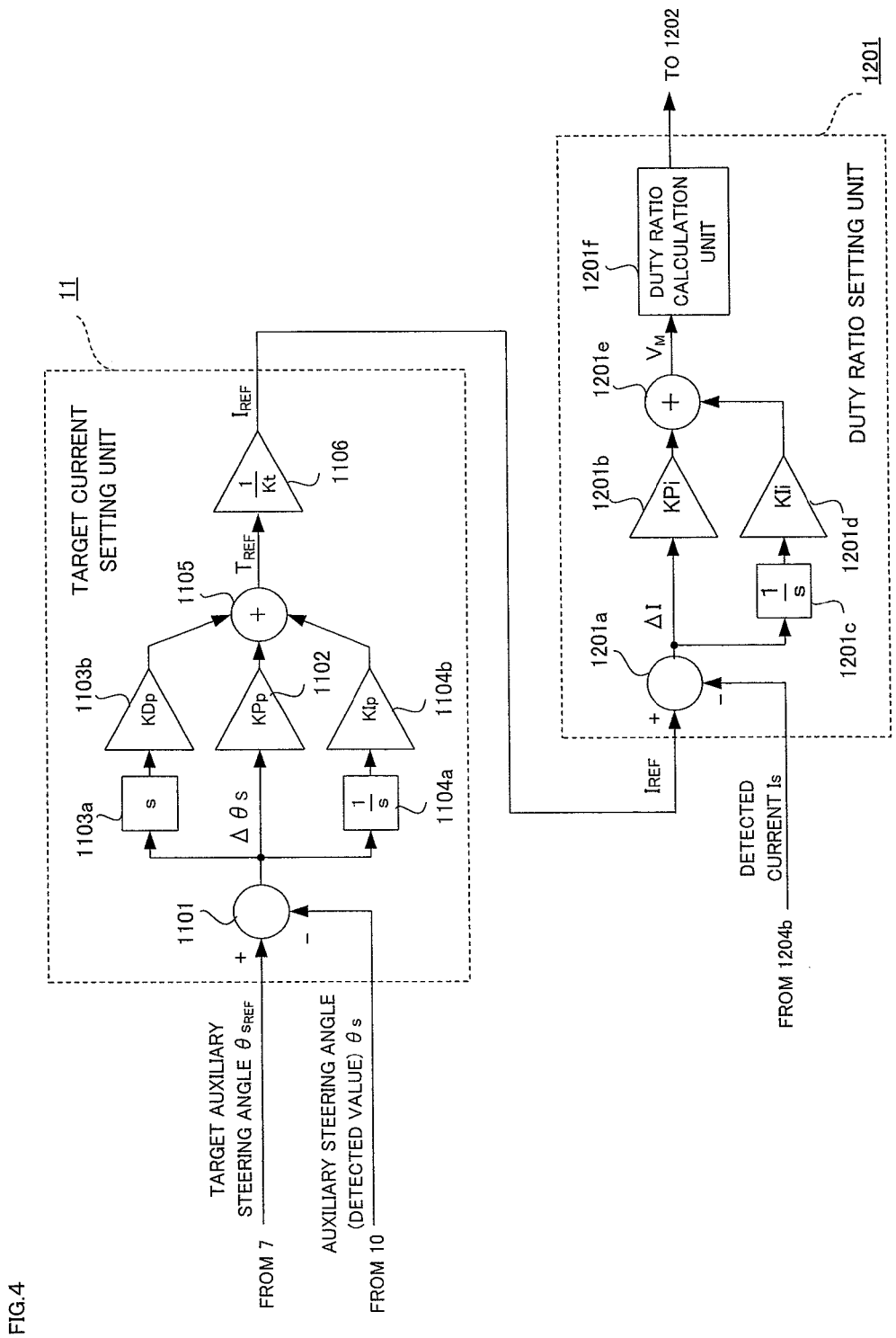
FIG. 4 is a block diagram showing a construction example of a target current setting unit and a duty ratio setting unit in FIG. 1. (Embodiment 1)

FIG. 4 is a block diagram showing a construction example of the target current setting unit 11 and the duty ratio setting unit 1201.

In FIG. 4, the target current setting unit 11 is provided with a subtracter 1101 that calculates an auxiliary steering angle deviation $\Delta\theta s$, an amplifier 1102 that amplifies the auxiliary steering angle deviation $\Delta\theta s$, a differentiator 1103*a* that differentiates the auxiliary steering angle deviation $\Delta\theta s$, an integrator 1104*a* that integrates the auxiliary steering angle deviation $\Delta\theta s$, amplifiers 1103*b*, 1104*b* that amplify a differentiated value and an integrated value, respectively, an adder 1105 that calculates a target torque $T_{REF}$ by adding the output values of the respective amplifiers 1102, 1103*b*, 1104*b* to one another, and a power amplifier 1106 that converts the target torque $T_{REF}$ into the target current $I_{REF}$.

In addition, the duty ratio setting unit 1201 is provided with a subtracter 1201*a* that calculates a current deviation $\Delta I$, an amplifier 1201*b* that amplifies the current deviation $\Delta I$, an integrator 1201*c* that integrates the current deviation $\Delta I$, amplifiers 1201*d* that amplify an integrated value, an adder 1201*e* that calculates a target application voltage $V_M$ by adding the output values of the respective amplifiers 1201*d*, 1201*d* to one another, and a duty ratio calculation unit 1201*f* that converts the target application voltage $V_M$ into the duty ratio.

First of all, in the target current setting unit 11, the subtracter 1101 calculates the auxiliary steering angle deviation $\Delta\theta s$ ($=\theta s_{REF} - \theta s$) between the target auxiliary steering angle $\theta s_{REF}$ and the detected auxiliary steering angle $\theta s$, and the amplifier 1102 inputs to the adder 1105 a value that is obtained by multiplying the auxiliary steering angle deviation $\Delta\theta s$ by a proportional gain KPp.

On the other hand, the differentiator 1103a differentiates the auxiliary steering angle deviation $\Delta\theta s$, and the amplifier 1103b multiplies the differentiated value from the differentiator 1103a by a differential gain KDp, and inputs it to the adder 1105. In addition, the integrator 1104a integrates the auxiliary steering angle deviation $\Delta\theta s$, and the amplifier 1104b multiplies the integrated value from the integrator 1104a by an integral gain KIp and inputs it to the adder 1105.

The adder 1105 calculates the target torque $T_{REF}$ by adding three multiplication results of the respective amplifiers 1102, 1103b, 1104b to one another.

Here, let us assume that the three gains (KPp, KDp and KIp) of the respective amplifiers 1102, 1103b, 1104b are set in an optimal manner in accordance with the frequency characteristic of the electric motor 212 in the case when the auxiliary steering angle is output with the generated torque of the electric motor 212 in the auxiliary steering angle superposition mechanism 2 being taken as an input.

Here, assuming that a torque constant representing the relation of a generated torque $T_M$ with respect to a drive current $I_M$ of the electric motor 212 is Kt, the generated torque $T_M$ of the electric motor 212 is expressed as shown by the following equation (5).

$$T_M = Kt \times I_M \qquad (5)$$

Accordingly, the output amplifier 1106 converts the target torque $T_{REF}$ into the target current $I_{REF}$ by using the relation of equation (5).

The above-mentioned target current calculation processing is executed at each predetermined time (angle control period) in a repeated manner, whereby the target current $I_{REF}$ is sequentially updated and input to the current control unit 12.

Now, the operation of the duty ratio setting unit 1201 will be described below.

In FIG. 4, the target current $I_{REF}$ from the target current setting unit 11 and the detected current Is from the differential amplifier 1204b (current detection unit) are input to the duty ratio setting unit 1201, and the subtracter 1201a calculates the current deviation $\Delta I$ ($= I_{REF} - Is$) between the target current $I_{REF}$ and the detected current Is.

The amplifier 1201b inputs to the adder 1201e a value that is obtained by multiplying the current deviation $\Delta I$ by the proportional gain KPi. On the other hand, the integrator 1201c integrates the current deviation $\Delta I$, and the amplifier 1201d multiplies the integration result of the integrator 1201c by the integral gain KIi, and inputs it to the adder 1201e.

The adder 1201e calculates the target application voltage $V_M$ for the electric motor 212 by adding two multiplication results of the respective amplifiers 1201b, 1201d to each other.

Hereinafter, the duty ratio calculation unit 1201f calculates the duty ratio of the current supplied to the electric motor 212 by using the voltage of the drive power supply input to the current control unit 12 (electric motor driving unit). At this time, the duty ratio calculation unit 1201f calculates the duty ratio in such a manner that the voltage applied to the electric motor 212 becomes substantially equal to the target application voltage $V_M$ as a result of driving the electric motor 212 based on the duty ratio thus set or calculated.

Here, let us assume that the proportional gain KPi and the integral gain KIi of the respective amplifiers 1201b and 1201d are set based on the electrical characteristic of the electric motor 212 so as to make the current control characteristic suitable for controlling the auxiliary steering angle.

Next, the operation of the current control unit 12 from the duty ratio setting unit 1201 onward will be described below while referring to FIG. 1.

The duty ratio output from the duty ratio setting unit 1201 is input to the FET driver 1202.

The FET driver 1202 PWM controls the voltage applied to the electric motor 212 by on/off controlling four FETs 1203a, 1203b, 1203c, 1203d that together constitute the H bridge circuit, in accordance with the duty ratio.

In addition, the differential amplifier 1204b detects as the detected current Is, a voltage generated across the opposite ends of the current detection resistor 1204a in the wiring extending from the current control unit 12 to the electric motor 212.

The current control unit 12 controls the current flowing to the electric motor 212 by repeatedly executing the above-mentioned processing procedure at each predetermined time interval (current control period) in such a manner that the target current $I_{REF}$ (being sequentially updated at an angle control period) set by the target current setting unit 11 and the detected current Is coincide with each other.

Since the target current $I_{REF}$ from the target current setting unit 11 is updated at each predetermined angle control period, the current control processing by the current control unit 12 should control the current supplied to the electric motor 212 so as to coincide with the target current $I_{REF}$ until the next update after the target current $I_{REF}$ has been updated.

Accordingly, it is desirable that the current control period of the current control unit 12 be set shorter than the angle control period of the target current setting unit 11. In addition, at this time, it is desirable that these two control periods (i.e., the current control period and the angle control period) be synchronized with each other, but the respective controls may be operated asynchronously with each other.

Next, reference will be made to the operation of the failure detection unit 18 in FIG. 1 at the time of failure detection. First, an operation at the time when the auxiliary steering angle detection unit 10 has failed will be described while referring to FIG. 1.

In case where the auxiliary steering angle detection unit 10 has failed, the rotation angle $\theta_M$ of the electric motor 212 can not be detected in an accurate manner, so a feedback system to control the rotational angle of the electric motor 212 fails, and the electric motor 212 will operate to rotate without any relation to the steering of the driver (rotation failure). Since the steering apparatus becomes unable to function in a proper manner under such a condition, the rotation of the electric motor 212 should be stopped as soon as possible.

Accordingly, when detecting the rotation failure of the auxiliary steering angle detecting unit 10, the failure detection unit 18 stops the current supply to the electric motor 212 by cutting off the power supply to the current control unit 12 through the relay control unit 17 and the drive power supply relay driving unit 16.

In addition, the failure detection unit 18 drives the short-circuit relay 13 through the relay control unit 17 and the short-circuit relay driving unit 14, so that the opposite terminals of the electric motor 212 are short-circuited, thereby electrically suppressing the rotation of the electric motor 212.

At this time, the processing of stopping the current drive to the electric motor 212 is carried out by stopping the FET driver 1202 through the relay control unit 17 thereby to turn off all the FETs 1203a-1203d, or by driving the drive power supply relay 15 through the relay control unit 17 and the drive power supply relay driving unit 16 thereby to interrupt the power supplied to the FETs 1203*a*-1203*d* that together constitute the H bridge circuit. As a result, the steerable road wheels 5*a*, 5*b* can be steered in accordance with the driver's steering operation of the steering wheel.

Then, reference will be made to an operation in case where the detected current Is exceeds a specified range of the target current $I_{REF}$ due to the failure of the differential amplifier 1204*b* (current detection unit) or the like while referring to FIG. 1 and FIG. 4.

In general, the target current setting unit 11 is constructed such that it should not output the target current $I_{REF}$ in excess of a maximum current that can be supplied to the electric motor 212.

For example, when the detected current Is exceeds a range of the target current defined by a maximum current due to a failure or the like, the polarity of the current deviation ΔI due to the subtracter 1201*a* in the duty ratio setting unit 1201 (see FIG. 4) constantly remains the same or unchanged without regard to the value of the target current $I_{REF}$. At this time, the integrator 1201*c* constantly integrates the current deviation ΔI of the same polarity, so the target application voltage $V_M$ sticks to the polarity in one direction, and hence the electric motor 212 operates to rotate only in either one direction (rotation failure).

Accordingly, even when detecting such a rotation failure, the failure detection unit 18 electrically suppresses the rotation failure of the electric motor 212 by stopping the current drive to the electric motor 212 through the relay control unit 17 and the drive power supply relay driving unit 16, and further by driving the short-circuit relay 13 through the short-circuit relay driving unit 14 thereby to short-circuit the opposite terminals of the electric motor 212. As a result, the steerable road wheels 5*a*, 5*b* can be steered in accordance with the driver's steering operation of the steering wheel.

Subsequently, reference will be made to an operation in case where the power supplied to the steering apparatus of FIG. 1 is interrupted due to disengagement or disconnection of the terminals of an on-board battery (not shown).

When the power supplied from the on-board battery is interrupted, the electric motor 212 in the auxiliary steering angle superposition mechanism 2 becomes a state in which it can be caused to freely rotate from an output shaft side.

Thus, when the electric motor 212 is put into a freely rotatable state, the electric motor 212 tends to rotate freely even if the driver is strongly holding the steering wheel 1, so the steerable road wheels 5*a*, 5*b* are automatically steered toward a neutral point under the action of the self alignment torque generated during the travel of the vehicle.

However, the short-circuit relay 13 is constructed in such a manner that it short-circuits the opposite terminals of the electric motor 212 when power is not supplied to the short-circuit relay 13. Accordingly, when the power supply is cut off, the short-circuit relay 13 is driven to move from the position shown in FIG. 1 to short-circuit the opposite terminals of the electric motor 212, so the idling failure of the electric motor 212 can be electrically suppressed. As a result, the steerable road wheels 5*a*, 5*b* can be steered in accordance with the driver's steering operation of the steering wheel.

Next, reference will be made to an operation in case where either of the FETs 1203*a*-1203*d* for supplying the current to the electric motor 212 fails.

When either of the FETs 1203*a*-1203*d* fails, there occurs a shortage of the driving force of the electric motor 212, thus giving rise to a possibility that the electric motor 212 falls into a state of idling failure.

Accordingly, when detecting such a failure state, the failure detection unit 18 stops the current drive to the electric motor 212 through the relay control unit 17, and in addition, drives the short-circuit relay 13 through the short-circuit relay driving unit 14, so that the opposite terminals of the electric motor 212 are short-circuited, thereby electrically suppressing the idling failure of the electric motor 212. As a result, the steerable road wheels 5*a*, 5*b* can be steered in accordance with the driver's steering operation of the steering wheel.

Then, reference will be made to an operation in case where the detected current Is constantly becomes within the range of the target current $I_{RE}F$ due to the failure of the differential amplifier 1204*b* or the like. Here, note that the target current $I_{REF}$ does not exceed the maximum current that can be supplied to the electric motor 212, as previously stated.

Accordingly, when the detected current Is is put into an abnormality within the specified range thereof, the polarity of the current deviation ΔI (see FIG. 4) of the target current $I_{REF}$ based on the auxiliary steering angle deviation Δθs and the detected current Is within the specified range resulting from the failure substantially coincides with the polarity of the auxiliary steering angle deviation Δθs. That is, the driving direction of the electric motor 212 becomes coincident with the driving direction due to the target current setting unit 11.

In this case, the drive current to the electric motor 212 is not controlled, so the electric motor 212 is driven to operate in a vibratory manner, but the vibration of the electric motor 212 is generated following the target auxiliary steering angle $θs_{REF}$. Accordingly, even if the control of the electric motor 212 is continued as it is, the steerable road wheels 5*a*, 5*b* are not steered in a direction not intended by the driver.

Therefore, even if the failure detection unit 18 detects an abnormality within the specified range of the detected current Is, the current control unit 12 need not be stopped urgently.

However, when the straight-ahead driving detection unit 19 makes a determination that the vehicle is in a straight-ahead driving state, after the failure detection unit 18 has detected the abnormality within the specified range, the relay control unit 17 stops the current drive to the electric motor 212, and in addition, drives the short-circuit relay 13 through the short-circuit relay drivel unit 14, so that the opposite terminals of the electric motor 212 are short-circuited, thereby electrically suppressing the rotation of the electric motor 212.

In addition, it is possible to suppress a failure which is caused due to the failure of the current control unit 12, and in which the electric motor 212 generates an excessive amount of driving (drive current $I_M$) though its driving direction is correct, i.e., a failure in which the electric motor 212 does not rotate on its own axis (non-rotation failure) can be suppressed.

As a result, it becomes possible to steer the steerable road wheels 5*a*, 5*b* in accordance with the driver's steering operation of the steering wheel, and at the same time, the auxiliary steering angle is controlled to "zero degrees" in the straight-ahead driving state, so the neutral point of the steering wheel 1 and the neutral point of the steerable road wheels 5*a*, 5*b* come to coincide with each other.

Embodiment 2

Figure 5:
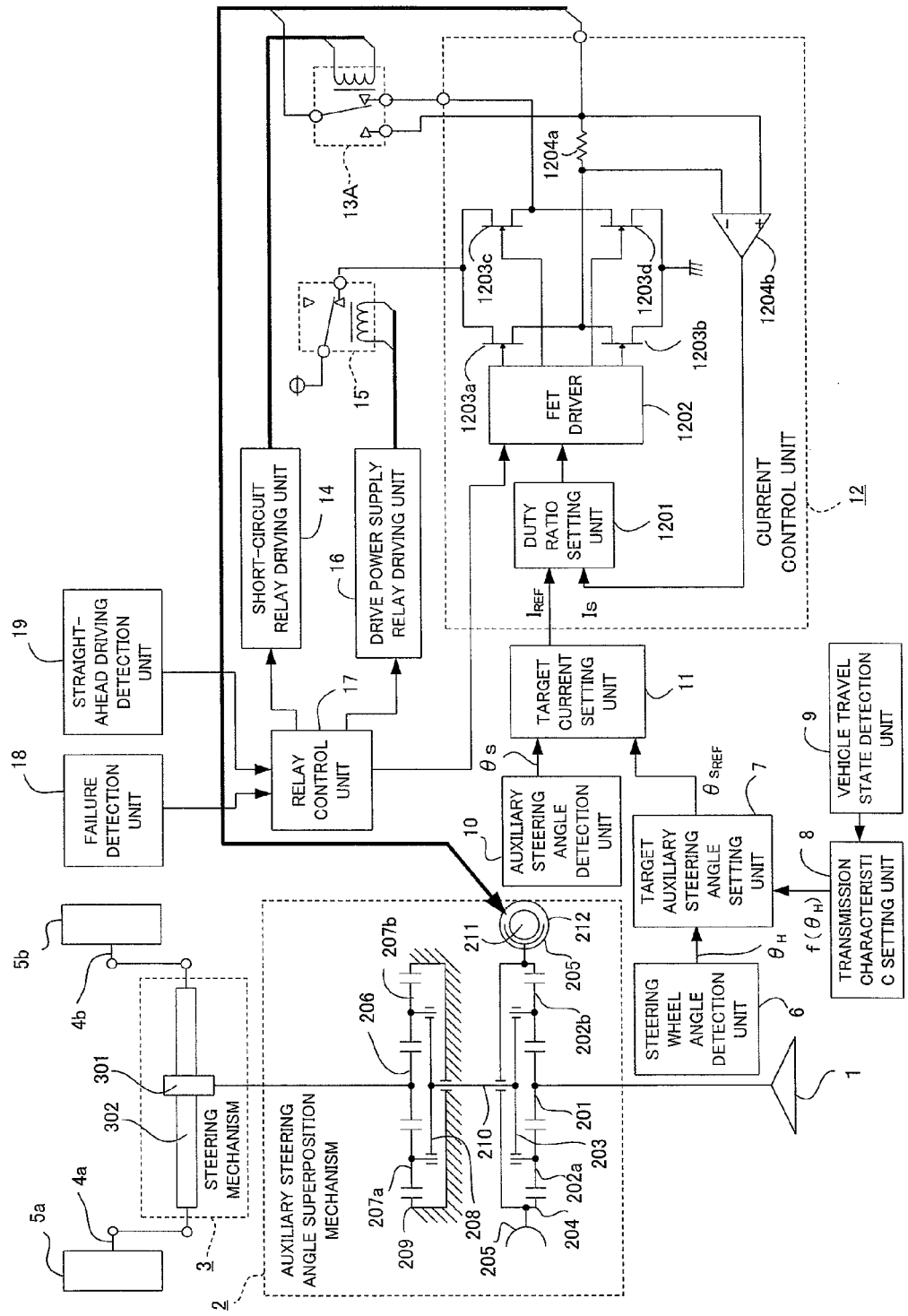
FIG. 5 is a block diagram showing the general outline of a steering apparatus for a vehicle according to a second embodiment of the present invention. (Embodiment 2)

Although the short-circuit relay 13 of the above-mentioned first embodiment (FIG. 1) only acts to short-circuit the opposite terminals of the electric motor 212 at the time when a failure is detected, it may be constructed, as shown by a short-circuit relay 13A in FIG. 5, such that upon detection of a failure, the opposite terminals of the electric motor 212 are short-circuited, and at the same time, current paths for the H bridge circuit (FETs 1203*a*-1203*d*) and the electric motor 212 are interrupted.

FIG. 5 is a block diagram showing a steering apparatus for a vehicle according to a second embodiment of the present invention, wherein parts similar to those described above (see FIG. 1) are identified by the same symbols or by the same symbols with "A" affixed to their ends, while omitting a detailed explanation thereof. In comparison with FIG. 1, the construction of FIG. 5 is different therefrom in the structure of the short-circuit relay 13A.

That is, while the short-circuit relay 13 in FIG. 1 merely operates to short-circuit the opposite terminals of the electric motor 212, the short-circuit relay 13A of FIG. 5 is switched from the illustrated state upon detection of a failure, so that it short-circuits the opposite terminals of the electric motor 212 and at the same time interrupts the paths to the H bridge circuit and the electric motor 212.

According to the construction of FIG. 5, the above-mentioned processing to stop the drive current to the electric motor 212 need not necessarily be executed.

In the above-mentioned first and second embodiments, description has been given to the case where a DC motor (with a brush) having two input terminals is used as the electric motor 212, but a three-phase DC brushless motor can instead be used. In this case, there are adopted a target current setting and a motor current control method matched to a control method of the DC brushless motor.

In addition, although description has also been given to the case where the rotation angle $\theta_M$ of the electric motor 212 (the auxiliary steering angle $\theta s$ according to the auxiliary steering angle superposition mechanism 2) is controlled, the steered angle of the steerable road wheels 5a, 5b can be practically controlled. In this case, by providing a steering angle detection unit (not shown) that detects the steering angle of the steerable road wheels 5a, 6b, or the rotation angle of the pinion gear 301 or the linear motion position of the rack 301 of the rack-and-pinion type steering mechanism 3, or the like, the electric motor 212 can be driven so as to make the target steering angle $\theta p_{REF}$ (see FIG. 2) and an output value of the steering angle detection unit coincide with each other.

In addition, although a construction having the auxiliary steering angle superposition mechanism 2 and the two planetary gear mechanisms combined with each other has been applied, any construction can be applied which is capable of superposing the auxiliary steering angle $\theta s$ with respect to the steering of the steering wheel 1 (the steering wheel angle $\theta_H$). In addition, a mechanism for stopping the rotation of the electric motor 212 in a mechanical manner can be used together, as referred to in the aforementioned conventional apparatus.

Embodiment 3

Figure 6:
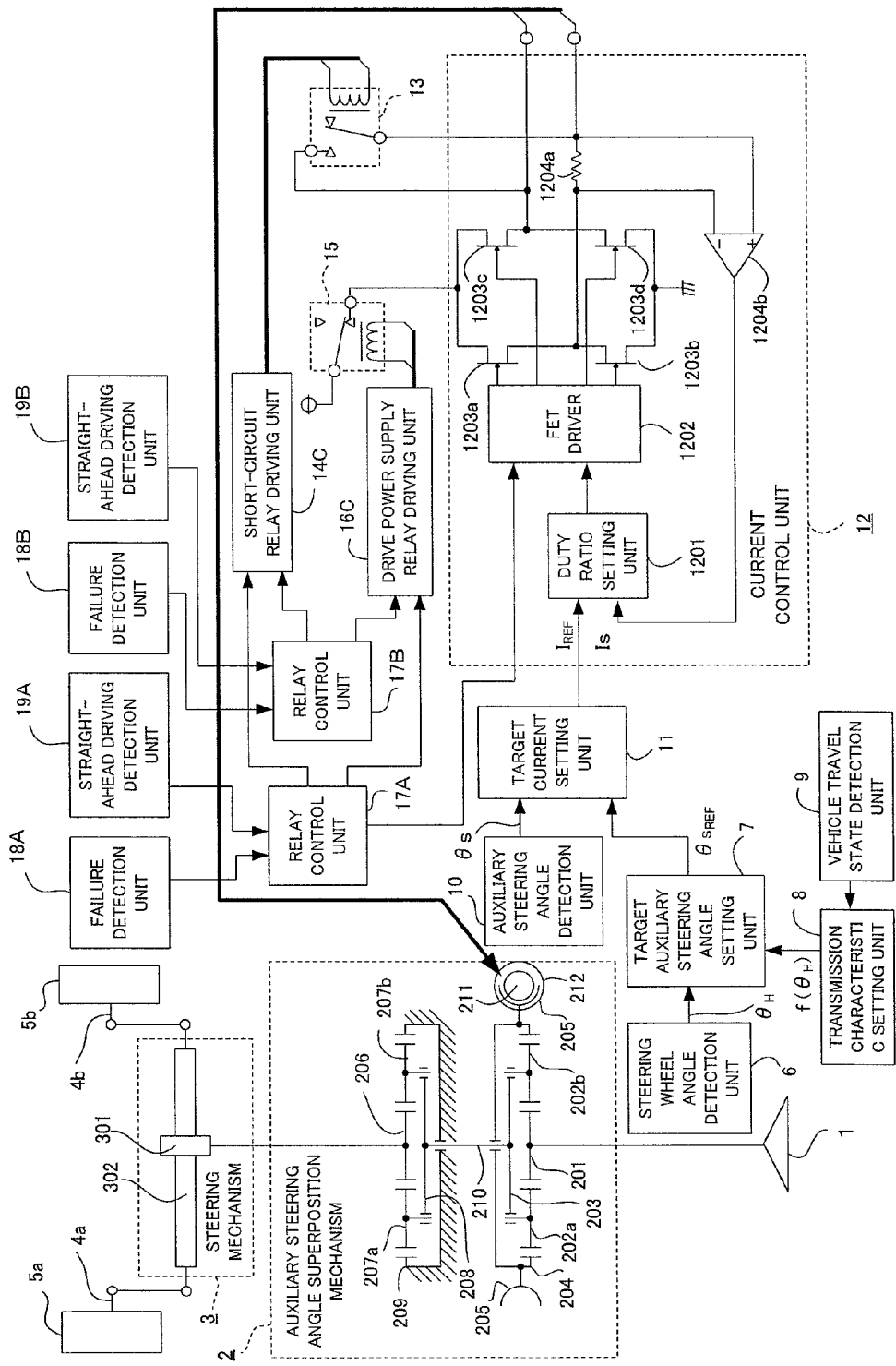
FIG. 6 is a block diagram showing the general outline of a steering apparatus for a vehicle according to a third embodiment of the present invention. (Embodiment 3)

In the above-mentioned first and second embodiments (FIG. 1 and FIG. 5), only a single system comprising the relay control unit 17, the failure detection unit 18, and the straight-ahead driving detection unit 19 is used, but a plurality of (e.g., two) systems comprising a relay control unit 17A, a failure detection unit 18A and a straight-ahead driving detection unit 19A, as well as a relay control unit 17B, a failure detection unit 18B and a straight-ahead driving detection unit 19B can also be used, as shown in FIG. 6.

FIG. 6 shows a steering apparatus for a vehicle according to a third embodiment of the present invention, wherein parts similar to those described above (see FIG. 1) are identified by the same symbols or by the same symbols with "C" affixed to their ends, while omitting a detailed explanation thereof.

In comparison with FIG. 1, the construction of FIG. 6 is different therefrom in that it has two systems which are arranged in parallel with each other, and which comprise relay control units 17A, 17B, failure detection units 18A, 18B, and straight-ahead driving detection units 19A, 19B, and is also different in the operations of a short-circuit relay driving unit 14C and a drive power supply relay driving unit 16C.

In FIG. 6, the relay control unit 17A, the failure detection unit 18A and the straight-ahead driving detection unit 19A have identical functions to those of the relay control unit 17B, the failure detection unit 18B and the straight-ahead driving detection unit 19B, respectively. That is, the failure detection units 18A, 18B respectively detect failures independently from each other, and the straight-ahead driving detection units 19A, 19B also respectively detect straight-ahead driving states independently from each other.

In addition, the relay control units 17A, 17B decide the operations of the short-circuit relay 13 and the drive power supply relay 15 through the short-circuit relay driving unit 14C and the drive power supply relay driving unit 16C in accordance with the kinds of failure detection signals from the failure detection units 18A, 18B, respectively, which are individually connected to the relay control units 17A, 17B, and in accordance with detection output signals from the straight-ahead driving detection units 19A, 19B, respectively, which are individually connected to the relay control units 17A, 17B.

When at least one of the relay control units 17A, 17B outputs a short-circuit operation, the short-circuit relay driving unit 14C switches the short-circuit relay 13 from its illustrated state thereby to short-circuit the opposite terminals of the electric motor 212.

In addition, when at least one of the relay control units 17A, 17B outputs a drive power supply interruption, the drive power supply relay driving unit 16C switches the drive power supply relay 15 from its illustrated state thereby to interrupt the drive power supply to the H bridge circuit.

In this case, it is desirable that an A system 17A-19A and a B system 17B-19B be formed of separate CPUs (not shown), respectively, so as to ensure a dual system.

In case where the A system and the B system are formed of separate CPUs, respectively, individual independent input circuits of the CPUs are used for the individual failure detection units 18A, 18B, respectively, so in particular, the reliability of failure detection for the input circuits is improved.

In addition, the short-circuit relay 13 can be constructed such that it short-circuits the opposite terminals of the electric motor 212 and at the same time interrupts the power supply paths to the H bridge circuit and the electric motor 212, as in the above-mentioned second embodiment (FIG. 5).

Moreover, as stated above, a three-phase DC brushless motor can be used as the electric motor 212, and the steering angle of the steerable road wheels 5a, 5b can be controlled in place of the angle control of the electric motor 212. Also, any kind of mechanism can be used as the auxiliary steering angle superposition mechanism 2, and a mechanism for stopping the rotation of the electric motor 212 in a mechanical manner can be used together, as in the aforementioned conventional apparatus.

As described above, the steering apparatus for a vehicle according to the present invention, which has the steering mechanism 3 for steering the steerable road wheels 5a, 5b by means of the steering wheel 1 that is operated by the driver and the auxiliary steering angle superposition mechanism 2 by which an auxiliary steering angle can be superposed, includes: the transmission characteristic setting unit 8 that sets the transmission characteristic f ($\theta_H$) between the steering angle of the steering wheel 1 and the steered angle of the steerable road wheels 5a, 5b in accordance with the traveling condition of the vehicle; the steering wheel angle detection unit 6 that detects the steering-wheel steering angle (steering wheel angle $\theta_H$) of the steering wheel 1 operated by the driver; and the auxiliary steering angle detection unit 10 that detects the auxiliary steering angle θs to be steered by the auxiliary steering angle superposition mechanism 2 (or the steering angle detection unit that detects the steered angle of the steerable road wheels).

In addition, the steering apparatus for a vehicle according to the present invention further includes the target driving amount calculation unit (the target current setting unit 11) that generates the target auxiliary steering angle $\theta s_{REF}$ (or the target steering angle) added by the auxiliary steering angle superposition mechanism 2 based on the steering-wheel steering angle detected value (the steering wheel angle $\theta_H$) from the steering wheel angle detection unit 6 and the transmission characteristic $f(\theta_H)$, and calculates the target amount of driving of the electric motor 212 (the target current $I_{REF}$) so as to make the target auxiliary steering angle $\theta s_{REF}$ and the auxiliary steering angle θs (the detected value) from the auxiliary steering angle detection unit 10 coincide with each other (or so as to make the target steering angle and the steering angle detected value from the steering angle detection unit coincide with each other).

Further, the steering apparatus for a vehicle according to the present invention includes: the electric motor driving unit (the current control unit 12) that drives the electric motor 212 in accordance with the target amount of driving; and the relay unit (the short-circuit relay 13 and the drive power supply relay 15) that inhibits the rotation of the electric motor 212 by short-circuiting the opposite terminals of the electric motor 212 under a predetermined condition.

According to this, the rotation of the electric motor can be inhibited in a quick manner without regard to the failure state of the electric motor driving unit, whereby the steerable road wheels can be steered in accordance with driver's steering operation of the steering wheel. In addition, when the power supply to the steering apparatus for a vehicle is interrupted, the short-circuit relay 13 can operate, without power supply, to short-circuit the opposite terminals of the electric motor 212.

In addition, the relay unit (the short-circuit relay 13 and the drive power supply relay 15) is constructed to switch an electrical connection operation to the electric motor 212 in addition to performing the operation of short-circuiting the opposite terminals of the electric motor 212, so that it performs cutting off the drive current to the electric motor 212 and short-circuiting the opposite terminals thereof at the same time. With such an construction, the rotation of the electric motor 212 can be inhibited in a quick manner without regard to the state of the electric motor driving unit, whereby the steerable road wheels can be steered in accordance with driver's steering operation of the steering wheel.

Moreover, the relay unit is constructed in such a manner that it short-circuits the opposite terminals of the electric motor when the power supply to the relay unit is cut off. With such a construction, even if the power supply is cut off during the operation of the steering apparatus for a vehicle, the rotation of the electric motor 212 can be inhibited in a quick manner, whereby the steerable road wheels can be steered in accordance with driver's steering operation of the steering wheel.

Further, provision is made for the failure detection unit 18 (18A, 18B) that detects at least the failure of the electric motor driving unit (the current control unit 12), and the operation of the relay unit is controlled in accordance with the kind of the failure detected by the failure detection unit. Thus, the rotation of the electric motor 212 can be inhibited in a quick manner upon detection of the failure, whereby the steerable road wheels can be steered in accordance with driver's steering operation of the steering wheel.

In addition, when the rotation failure or the idling failure of the electric motor 212 is detected by the failure detection unit 18, the relay unit operates to stop the driving of the electric motor 212, and at the same time short-circuit the opposite terminals of the electric motor 212, as a result of which the rotation failure of the electric motor 212 can be inhibited in a quick manner upon detection of the failure, whereby the steerable road wheels can be steered in accordance with driver's steering operation of the steering wheel.

Here, note that the rotation failure of the electric motor 212 is a failure of the auxiliary steering angle detection unit 10 at the time when the target driving amount calculation unit (the target current setting unit 11) calculates the target amount of driving (the target current $I_{REF}$) so as to make the target auxiliary steering angle $\theta s_{REF}$ and the auxiliary steering angle θs (the detected value) coincide with each other.

Also, the rotation failure of the electric motor 212 is a failure in which an excessive amount of driving in one rotational direction with respect to the electric motor 212 is generated due to the failure of the steering angle detection unit or the failure of the electric motor driving unit (the current control unit 12) at the time when the target driving amount calculation unit calculates the target amount of driving so as to make the target steering angle and the steering angle detected value coincide with each other.

Further, the idling failure of the electric motor 212 is a failure in which electric current can not be supplied to the electric motor 212 due to the failure of the electric motor driving unit (the current control unit 12).

According to the present invention, the relay unit operates to short-circuit the opposite terminals of the electric motor 212 in case where any of the above-mentioned various kinds of failures is detected by the failure detection unit 18, so the rotation failure of the electric motor 212 can be inhibited in a quick manner upon occurrence of a failure, whereby the steerable road wheels can be steered in accordance with driver's steering operation of the steering wheel.

In addition, according to the present invention, provision is made for the straight-ahead driving detection unit 19 (19A and 19B) which detects that the vehicle is in a straight-ahead driving state, and the relay unit operates to continue the driving control of the auxiliary steering angle superposition mechanism 2 when the non-rotation failure of the electric motor 212 (failure to rotate on its own axis) is detected by the failure detection unit 18, and in addition, stop the driving of the electric motor 212 and at the same time short-circuit the opposite terminals of the electric motor 212 when it is detected by the straight-ahead driving detection unit 19 that the vehicle is in the straight-ahead driving state.

Thus, by continuing, upon occurrence of the non-rotation failure of the electric motor 212, the driving control of the auxiliary steering angle superposition mechanism 2 until the vehicle is put into a straight-ahead driving state, there occurs no sudden change of steering in the steerable road wheels 5a, 5b with respect to the driver's steering operation of the steering wheel. In addition, the rotation of the electric motor 212 is inhibited when the vehicle is in the straight-ahead driving state, and hence the steerable road wheels can be steered in accordance with the steering operation of the steering wheel with the neutral point of the steering wheel 1 and the neutral point of the steerable road wheels 5a, 5b being made to coincide with each other.

Here, note that the non-rotation failure of the electric motor 212 is a failure in which an excessive amount of driving (drive current $I_M$) though the direction of driving being correct is generated with respect to the electric motor 212 resulting from the failure of the electric motor driving unit (the current control unit 12).

According to the present invention, in case where such a non-rotation failure of the electric motor 212 is detected, the relay unit operates to short-circuit the opposite terminals of the electric motor 212, so upon occurrence of the non-rotation failure, the rotation of the electric motor 212 can be inhibited in a quick manner, whereby the steerable road wheels can be steered in accordance with driver's steering operation of the steering wheel.

Moreover, in the steering apparatus for a vehicle according to the present invention, the failure detection unit comprises the plurality of failure detection units 18A, 18B (see FIG. 6) which are arranged in parallel to each other and are independent from each other, and each of the plurality of failure detection units 18A, 18B detects the same failure. In addition, the failure detection unit includes the relay control units 17A, 17B connected separately from each other, and relay driving units (the short-circuit relay driving unit 14C and the drive power supply relay driving unit 16C) that are connected in common to the individual relay control units 17A, 17B for driving the relay unit.

In addition, when the operation of short-circuiting the opposite terminals of the electric motor 212 is selected by the detection result of at least one failure detection unit among the plurality of failure detection units 18A, 18B, the relay unit performs the operation of short-circuiting the opposite terminals of the electric motor 212 regardless of the detection result of the other failure detection unit(s). As a result, failure detection can be made in a reliable manner even in case where either of the failure detection units does not function, thus making it possible to improve the reliability of failure detection.

Further, the plurality of failure detection units 18A, 18B are separately constructed by a plurality of CPUs, respectively, so not only the reliability of failure detection can be improved, but also the reliability of failure detection of an input part of each CPU can be improved.

The invention claimed is:

1. A steering apparatus for a vehicle which has a steering mechanism for steering steerable road wheels by means of a steering wheel that is operated by a driver and an auxiliary steering angle superposition mechanism by which an auxiliary steering angle can be superposed, said apparatus characterized by comprising:
   a transmission characteristic setting unit that sets a transmission characteristic between a steering angle of said steering wheel and a steered angle of steerable road wheels in accordance with a traveling condition of the vehicle;
   a steering wheel angle detection unit that detects a steering angle of said steering wheel operated by the driver;
   an auxiliary steering angle detection unit that detects an auxiliary steering angle to be steered by said auxiliary steering angle superposition mechanism or a steering angle detection unit that detects the steered angle of the steerable road wheels;
   a target driving amount calculation unit that generates a target auxiliary steering angle or a target steering angle added by said auxiliary steering angle superposition mechanism based on a steering-wheel steering angle detected value from said steering wheel angle detection unit and said transmission characteristic, and calculates a target amount of driving of said electric motor so as to make said target auxiliary steering angle and an auxiliary steering angle detected value from said auxiliary steering angle detection unit coincide with each other or so as to make said target steering angle and a steering angle detected value from said steering angle detection unit coincide with each other;
   an electric motor driving unit that drives said electric motor in accordance with said target amount of driving;
   a relay unit that inhibits the rotation of said electric motor by short-circuiting opposite terminals of said electric motor under a predetermined condition;
   a failure detection unit that detects at least a failure of said electric motor driving unit;
      wherein said relay unit is controlled in its operation in accordance with the kind of the failure detected by said the failure detection unit; and
   a straight-ahead driving detection unit that detects that said vehicle is in a straight-ahead driving state;
      wherein said relay unit operates to continue the driving control of said auxiliary steering angle superposition mechanism when a non-rotation failure of said electric motor is detected by said failure detection unit, and in addition, stop the driving of said electric motor and at the same time short-circuit the opposite terminals of said electric motor when it is detected by said straight-ahead driving detection unit that the vehicle is in a straight-ahead driving state.

2. The steering apparatus for a vehicle as set forth in claim 1, characterized in that said relay unit is constructed such that it switches an electrical connection operation to said electric motor in addition to a short-circuiting operation between the opposite terminals of said electric motor.

3. The steering apparatus for a vehicle as set forth in claim 1, characterized in that said relay unit is constructed such that it short-circuits the opposite terminals of said electric motor when power supplied to said relay unit is cut off.

4. The steering apparatus for a vehicle as set forth in claim 1, characterized in that when a rotation failure or an idling failure of said electric motor is detected by said failure detection unit, said relay unit operates to stop the driving of said electric motor and at the same time short-circuit the opposite terminals of said electric motor.

5. The steering apparatus for a vehicle as set forth in claim 4, characterized in that
   the rotation failure of said electric motor
   is a failure of said auxiliary steering angle detection unit at the time when said target driving amount calculation unit calculates said target amount of steering so as to make said target auxiliary steering angle and said auxiliary steering angle detected value coincide with each other, and
   is a failure in which an excessive amount of driving in one rotational direction with respect to said electric motor is generated due to a failure of said steering angle detection unit or a failure of said electric motor driving unit at the time when said target driving amount calculation unit calculates said target amount of driving so as to make said target steering angle and said steering angle detected value coincide with each other; and
   the idling failure of said electric motor is a failure in which electric current can not be supplied to said electric motor due to the failure of said electric motor driving unit.

6. The steering apparatus for a vehicle as set forth in claim 1, characterized in that the non-rotation failure of said electric motor is a failure in which an excessive amount of driving though a direction of driving being correct is generated with respect to said electric motor resulting from the failure of said electric motor driving unit.

7. The steering apparatus for a vehicle as set forth in claim 1, characterized in that said failure detection unit comprises a plurality of failure detection units which are arranged in parallel to one another and are independent from one another;

said plurality of failure detection units each detect the same failure, and include relay control units connected separately from each other, and relay driving units that are connected in common to the individual relay control units for driving said relay unit; and said relay unit performs an operation of short-circuiting the opposite terminals of said electric motor regardless of the detection results of the other failure detection units when the operation of short-circuiting the opposite terminals of said electric motor is selected by the detection result of at least one failure detection unit among said plurality of failure detection units.

8. The steering apparatus for a vehicle as set forth in claim 7, characterized in that said plurality of failure detection units are separately constructed by a plurality of CPUs, respectively.

* * * * *